(12) United States Patent
Takatori

(10) Patent No.: US 12,432,837 B2
(45) Date of Patent: Sep. 30, 2025

(54) LIGHTING CONTROL DEVICE FOR CONTROLLING LIGHT EMISSION OF PLURALITY OF LIGHTING DEVICES BY WIRELESS COMMUNICATION, LIGHTING DEVICE, PHOTOGRAPHING SYSTEM, CONTROL METHOD, AND STORAGE MEDIUM

(71) Applicant: CANON KABUSHIKI KAISHA, Tokyo (JP)

(72) Inventor: Tatsuo Takatori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 18/470,863

(22) Filed: Sep. 20, 2023

(65) Prior Publication Data

US 2024/0107650 A1 Mar. 28, 2024

(30) Foreign Application Priority Data

Sep. 22, 2022 (JP) ................................. 2022-151870

(51) Int. Cl.
| | |
|---|---|
| *H05B 47/19* | (2020.01) |
| *G03B 15/05* | (2021.01) |
| *H05B 47/105* | (2020.01) |
| *H05B 47/165* | (2020.01) |
| *H05B 47/17* | (2020.01) |

(52) U.S. Cl.
CPC ............ *H05B 47/19* (2020.01); *G03B 15/05* (2013.01); *H05B 47/105* (2020.01); *H05B 47/165* (2020.01); *H05B 47/17* (2020.01)

(58) Field of Classification Search
CPC ............ G03B 15/05; G03B 2215/0557; H05B 47/105; H05B 47/165; H05B 47/17; H05B 47/19; H05B 47/198
See application file for complete search history.

(56) References Cited

U.S. PATENT DOCUMENTS

| | | | | |
|---|---|---|---|---|
| 2010/0085164 A1* | 4/2010 | Beij | ....................... | H05B 47/19 |
| | | | | 340/10.5 |
| 2010/0259193 A1* | 10/2010 | Umezawa | .............. | H05B 47/19 |
| | | | | 315/297 |
| 2017/0142810 A1* | 5/2017 | Cho | ....................... | H05B 45/20 |
| 2020/0077494 A1* | 3/2020 | Kishimoto | ............. | H05B 45/20 |

FOREIGN PATENT DOCUMENTS

JP 2012-032618 A 2/2012

* cited by examiner

*Primary Examiner* — Raymond R Chai
(74) *Attorney, Agent, or Firm* — Cowan, Liebowitz & Latman, P.C.

(57) ABSTRACT

A lighting control device capable of checking shadow/shade on a subject intended by a user without impairing the real-time property. The lighting control device is wirelessly connected to a plurality of lighting devices each having a light unit capable of being on continuously, and controls turning on/off of the light units of the plurality of lighting devices. The lighting control device performs wireless communication with the plurality of lighting devices generates a turn-on instruction for the light unit, and transmits, to the plurality of lighting devices by the wireless communication: the turn-on instruction; information on a group to which each of the plurality of lighting devices belongs; and turn-on group information including a setting of one of light emission permission and light emission prohibition set for the group.

15 Claims, 8 Drawing Sheets

FIG. 6

| Bit | 7 | 6 | 5 | 4 | 3 | 2 | 1 | 0 |
|---|---|---|---|---|---|---|---|---|
| TURN-ON Gr. INFORMATION | — | — | — | Gr.E | Gr.D | Gr.C | Gr.B | Gr.A |
| Bit VALUE<br>LIGHT EMISSION PERMISSION: 1<br>LIGHT EMISSION PROHIBITION/UNUSED: 0 | 0 | 0 | 0 | 0 | 0 | 1 | 1 | 1 |

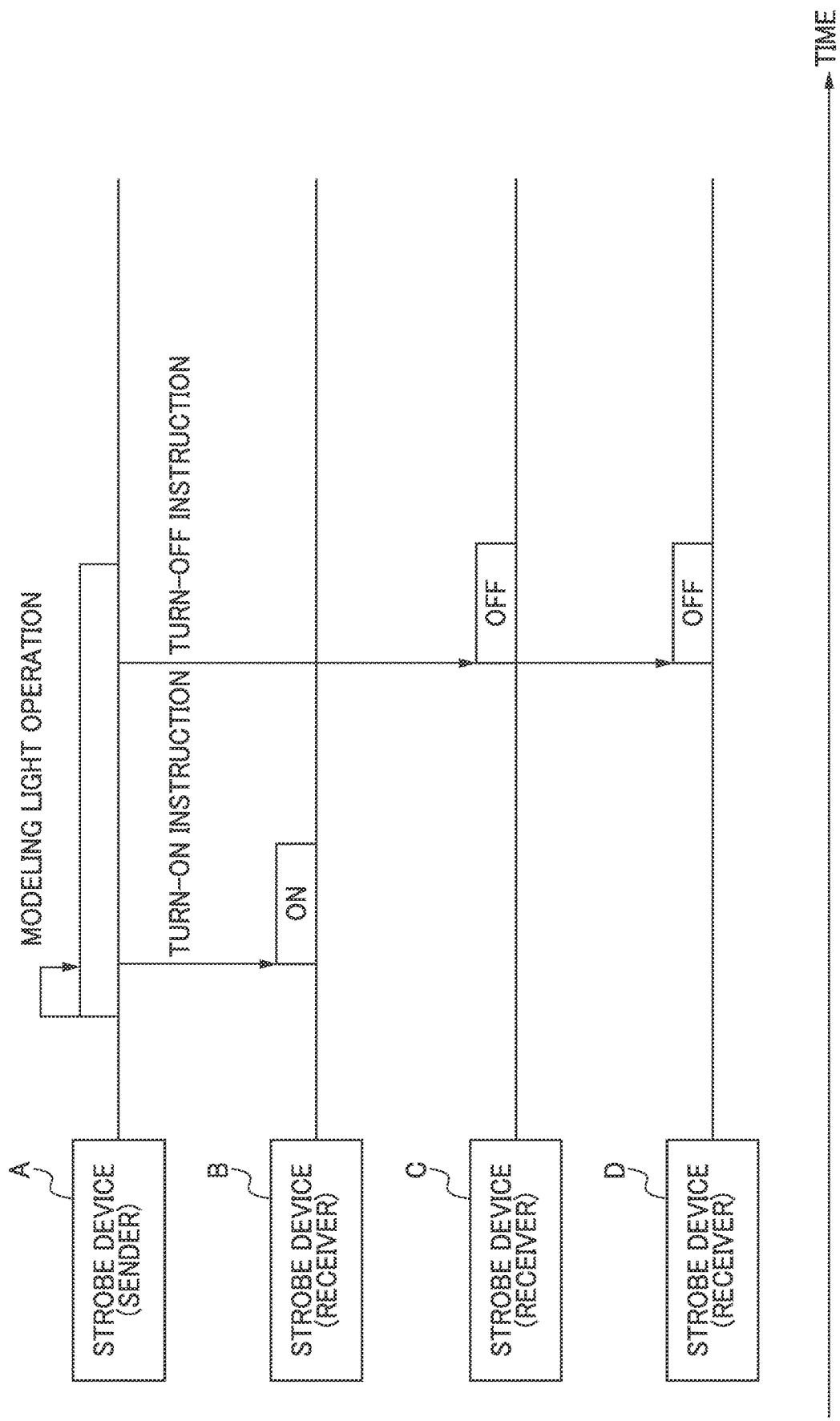

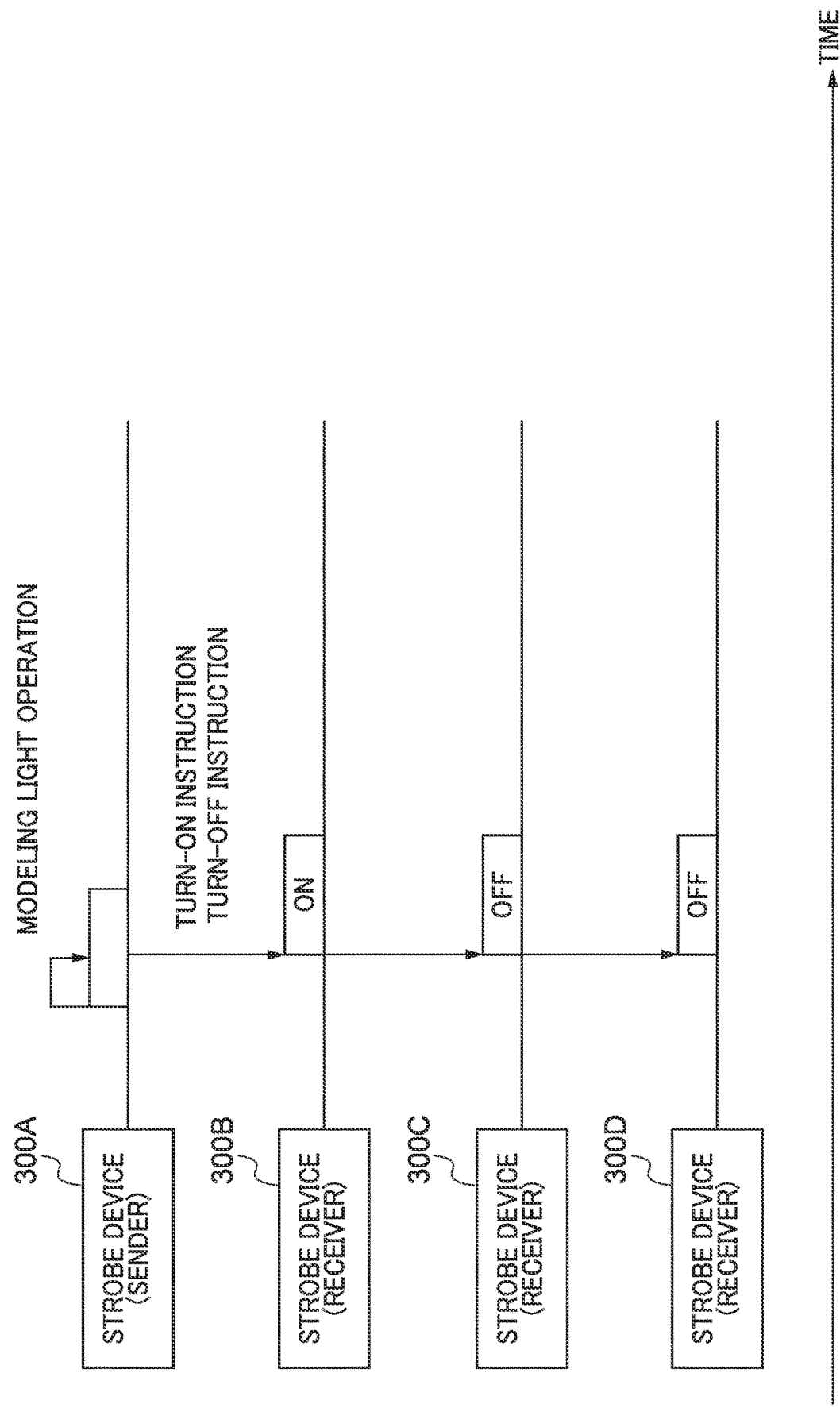

LIGHTING CONTROL DEVICE FOR CONTROLLING LIGHT EMISSION OF PLURALITY OF LIGHTING DEVICES BY WIRELESS COMMUNICATION, LIGHTING DEVICE, PHOTOGRAPHING SYSTEM, CONTROL METHOD, AND STORAGE MEDIUM

BACKGROUND OF THE INVENTION

Field of the Invention

The present invention relates to a lighting control device, a lighting device, a photographing system, a control method, and a storage medium, and more particularly, to a lighting control device for controlling light emission of a plurality of lighting devices by wireless communication, a lighting device, a photographing system, a control method, and a storage medium.

Description of the Related Art

There has been proposed a modeling light emission method capable of controlling a plurality of strobes by wireless communication to simultaneously emit light and checking shadow/shade on a subject in a short period of time. For example, Japanese Laid-Open Patent Publication No. 2012-32618 discloses a technique in which a plurality of strobes is arranged at a place away from a camera, and in response to a button operation of a user on one of the plurality of strobes, a modeling instruction is transmitted to another strobe out of the plurality of strobes by wireless communication to cause the plurality of strobes to simultaneously emit light.

In addition, a modeling light emission method has been proposed in which an LED light source is provided in a strobe device separately from a main light emitting unit including a strobe, and shadow/shade on a subject can be continuously checked using the LED light source.

In the case of using a strobe that emits light only for a short period of time and immediately turns off as in Japanese Laid-Open Patent Publication No. 2012-32618, the modeling instruction to be transmitted may be only the turn-on instruction. On the other hand, in the case of using an LED light source that can be continuously turned on, not only the turn-on instruction but also the turn-off instruction need to be sent as the modeling instruction.

For example, in the conventional photographing system shown in FIG. 2, it is assumed that only the LED light source of a strobe device B needs to be turned on in order to model the shadow/shade intended by the user. In this case, it is necessary not only to transmit the turn-on instruction for the LED light source from the strobe device A to the strobe device B, but also to transmit the turn-off instruction for the LED light source from the strobe device A to the strobe devices C and D. In the configuration in which the turn-on instruction and the turn-off instruction are separately transmitted as in the conventional example, the number of communications increases. In particular, in a poor wireless environment, it takes time to complete wireless communication, and the real-time property significantly deteriorates.

SUMMARY OF THE INVENTION

The present invention provides a lighting control device capable of checking shadow/shade on a subject intended by a user without impairing the real-time property, a lighting device, a photographing system, a control method, and a storage medium.

Accordingly, the present invention provides a lighting device having a light unit that is capable of being on continuously, the lighting device comprising at least one memory that stores a set of instructions, and at least one processor that is configured to, based on the instructions, cause the lighting device to: wirelessly connect to a lighting control device that is configured to control turning on/off of the light unit of the lighting device to perform wireless communication with the lighting control device; in a case where a turn-on instruction from the lighting control device is received via the wireless communication, determine whether the lighting device itself is a turn-on target or is not a turn-on target; and turn off the light unit in a case where it is determined that the lighting device itself is not the turn-on target, and turn on the light unit in a case where it is determined that the lighting device itself is the turn-on target.

Accordingly, the present invention provides a lighting control device that is wirelessly connected to a plurality of lighting devices each having a light unit capable of being on continuously and controls turning on/off of the light units of the plurality of lighting devices, the lighting control device comprising at least one memory that stores a set of instructions, and at least one processor that is configured to, based on the instructions, cause the lighting control device to: perform wireless communication with the plurality of lighting devices; generate a turn-on instruction for the light unit; and transmit, to the plurality of lighting devices by the wireless communication: the turn-on instruction; information on a group to which each of the plurality of lighting devices belongs; and turn-on group information including a setting of one of light emission permission and light emission prohibition set for the group.

Accordingly, the present invention provides a photographing system comprising: a plurality of lighting devices each having a light unit capable of being on continuously; and a lighting control device wirelessly connected to the plurality of lighting devices and configured to control turning on/off of the light units of the plurality of lighting devices, the photographing system comprising at least one memory that stores a set of instructions, and at least one processor that is configured to, based on the instructions, cause the lighting control device to: perform wireless communication with the plurality of lighting devices; generate a turn-on instruction for the light unit; and transmit, to the plurality of lighting devices by the wireless communication: the turn-on instruction; information on a group to which each of the plurality of lighting devices belongs; and turn-on group information including a setting of one of light emission permission and light emission prohibition set for the group; and cause each of the plurality of lighting devices to: perform the wireless communication with the lighting control device; in a case where the turn-on instruction from the lighting control device is received by the wireless communication, determine whether the lighting device itself is a turn-on target or is not a turn-on target; and turn off the light unit in a case where it is determined that the lighting device itself is not the turn-on target, and turn on the light unit in a case where it is determined that the lighting device itself is the turn-on target.

According to the present invention, it is possible to check the shadow/shade on the subject intended by the user without impairing the real-time property.

Further features of the present invention will become apparent from the following description of exemplary embodiments with reference to the attached drawings.

BRIEF DESCRIPTION OF THE DRAWINGS

FIG. 6 is a diagram showing an example of turn-on group information according to the embodiment of the present invention.

FIG. 7A is a timing chart of processing executed in the conventional photographing system shown in FIG. 2, in a configuration in which a turn-on instruction and a turn-off instruction are separately transmitted to a plurality of strobe devices.

FIG. 7B is a timing chart of processing, executed in the photographing system according to the present embodiment shown in FIG. 3, in a configuration in which a turn-on instruction and a turn-off instruction are transmitted to a plurality of strobe devices without being separated.

DESCRIPTION OF THE EMBODIMENTS

The present invention will now be described in detail below with reference to the accompanying drawings showing embodiments thereof. It should be noted that the components described in this embodiment are merely examples of the present invention, and the scope of the present invention is not limited thereto.

Figure 1:
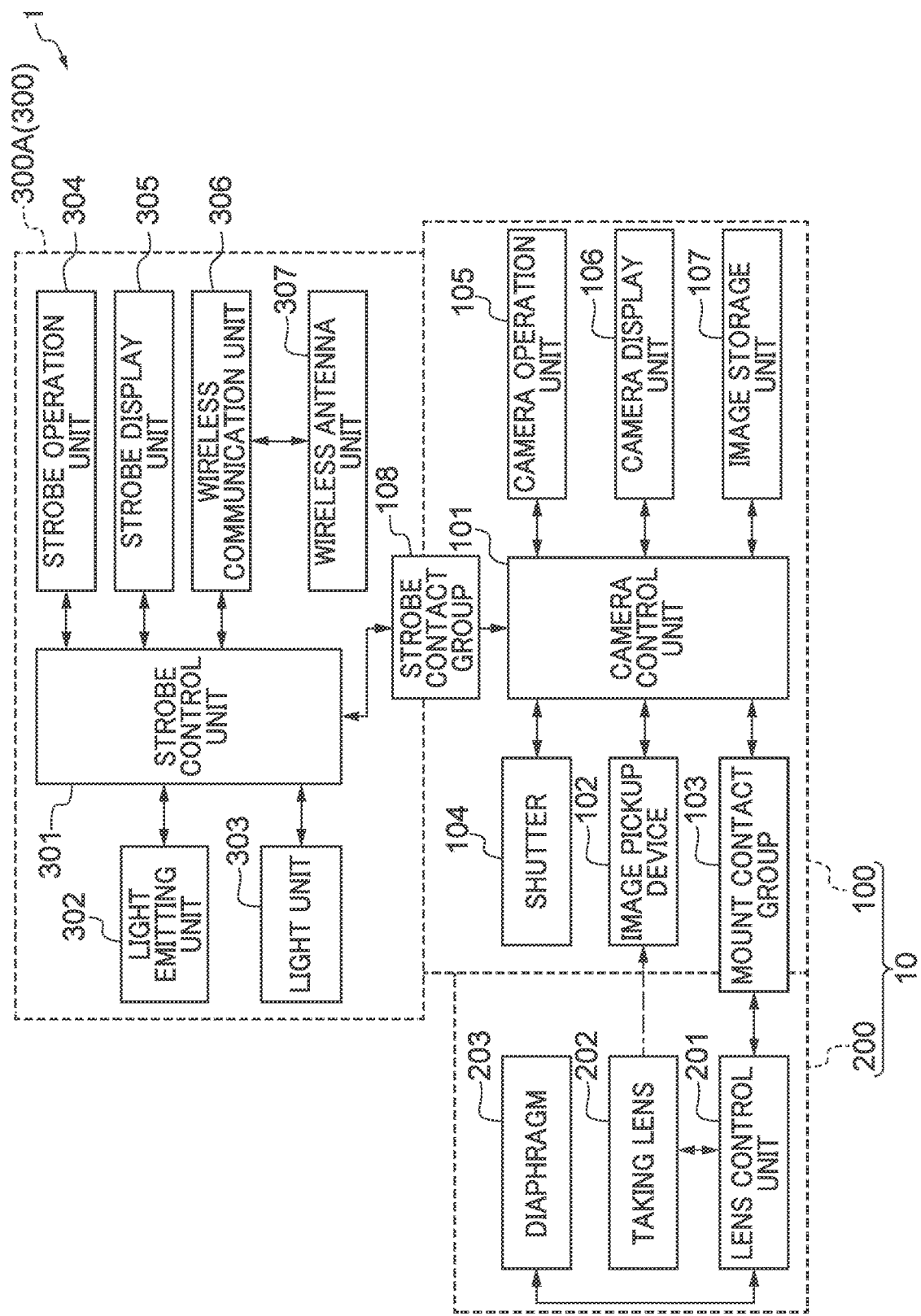
FIG. 1 is a diagram showing a hardware configuration of a strobe device included in a photographing system according to an embodiment of the present invention and a hardware configuration of an image pickup apparatus connected to the strobe device via wired connection.

FIG. 1 is a diagram showing a hardware configuration of a strobe device 300A (lighting control device) included in a photographing system 1 according to an embodiment of the present invention and a hardware configuration of an image pickup apparatus 10 connected to the strobe device 300A via wired connection.

Although not shown in FIG. 1, the photographing system 1 includes strobe devices 300B to 300D (lighting devices) wirelessly connected to the strobe device 300A. The hardware configuration of each of the strobe devices 300B to 300D is the same as that of the strobe device 300A. Therefore, when the hardware configuration of the strobe device 300A is described with reference to FIG. 1, the hardware configuration of the strobe device 300A is described as the hardware configuration of the strobe device 300 collectively referring to the strobe devices 300A to 300D.

As shown in FIG. 1, the image pickup apparatus 10 includes a camera body 100 and a lens 200. The camera body 100 and the lens 200 are mechanically and electrically connected to each other via a mount contact group 103. Note that the lens 200 is detachable from the camera body 100 in the present embodiment; however, the lens 200 may be integrated with the camera body 100. The strobe device 300 is mounted on an upper surface of the camera body 100. The strobe device 300 is replaceable with respect to the camera body 100. The camera body 100 and the strobe device 300 are electrically connected to each other through a strobe contact group 108 (wired communication unit).

The camera body 100 further includes a camera control unit 101, an image pickup device 102, a shutter 104, a camera operation unit 105, a camera display unit 106, and an image storage unit 107.

The lens 200 further includes a lens control unit 201, a taking lens 202, and a diaphragm 203.

The strobe device 300 further includes a strobe control unit 301, a light emitting unit 302, a light unit 303, a strobe operation unit 304, a strobe display unit 305, a wireless communication unit 306, and a wireless antenna unit 307. The camera control unit 101 is a microcomputer that controls the operation of each part of the camera body 100.

The image pickup device 102 is an image sensor including a photoelectric conversion element such as a CMOS and including an infrared cut filter, a low-pass filter, and the like. The image pickup device 102 photoelectrically converts incident light from the taking lens 202 to generate image data, and outputs the image data to the camera control unit 101.

The shutter 104 is disposed between the image pickup device 102 and the taking lens 202, and operates according to an instruction from the camera control unit 101. The shutter 104, based on an instruction, is closed to shade the image pickup device 102 at the time of non-photographing, and is opened at the time of live view and photographing to guide the incident light from the taking lens 202 to the image pickup device 102.

The camera operation unit 105 detects an operation instruction made by the user via a release button, a switch, a dial, a connection device, or the like attached to the camera body 100, and sends a signal corresponding to the operation instruction to the camera control unit 101. For example, when the user performs a half-press operation of pressing the release button about halfway, the camera operation unit 105 outputs an SW1 signal to the camera control unit 101 as an instruction signal corresponding to the half-press operation. Furthermore, when the user performs a full-press operation of deeply pressing the release button, the camera operation unit 105 outputs an SW2 signal to the camera control unit 101 as an instruction signal corresponding to the full-press operation.

The camera display unit 106 displays photographing information and a photographed image in accordance with an instruction from the camera control unit 101.

The camera control unit 101 controls the operation of the camera body 100 based on an instruction signal from the camera operation unit 105. In a case where the instruction signal from the camera operation unit 105 is the SW1 signal, the camera control unit 101 drives the image pickup device 102 to perform imaging, and repeats photometry control of measuring the luminance of the subject from the imaging result, and determines the exposure control value to be used at the time of photographing from the photometry result. Note that, in the present embodiment, the shutter speed, the aperture value, and the ISO sensitivity which are used at the time of photographing are collectively referred to as exposure control values. The determined exposure control value is displayed on the screen of the camera display unit 106. In a case where the instruction signal from the camera operation unit 105 is the SW2 signal, the camera control unit 101 drives the diaphragm in the taking lens 202, sets the sensitivity (ISO sensitivity) of the image pickup device 102, and controls the shutter 104 to irradiate the image pickup device 102 with light. The camera control unit 101 performs control to display the photographed image on the screen of the camera display unit 106 according to the image data acquired from the image pickup device 102 and write the image data in the image storage unit 107.

Next, a configuration of the lens 200 will be described.

The lens control unit 201 is a microcomputer that controls the operation of each part of the lens 200. The taking lens 202 includes a plurality of lenses, and forms a subject image on the image pickup device 102. The taking lens 202 further includes a diaphragm 203 for adjusting a light amount and a focus lens (not shown) for adjusting a focus.

The lens control unit 201 is controlled by the camera control unit 101 via the mount contact group 103, and adjusts the light amount and focus of light to be taken into the camera body 100 according to an instruction from the camera control unit 101.

Next, a configuration of the strobe device 300 will be described.

The strobe control unit 301 is a microcomputer that controls the operation of each part of the strobe device 300. The strobe control unit 301 is capable of communicating with the camera control unit 101 via the strobe contact group 108, and of receiving a light emission control instruction and camera information from the camera body 100 and of transmitting strobe information to the camera body 100.

The light emitting unit 302 includes a discharge tube, a light emitting capacitor, a light emitting circuit, and a light emitting optical system, and is capable of performing flash light emission.

The light unit 303 includes an LED, and is capable of being turned on more continuously than the light emitting unit 302. The light unit 303 is turned on or off according to an instruction from the strobe control unit 301. In the present embodiment, the light unit 303 includes the LED; however, the light unit 303 may adopt a light source that is capable of being continuously turned on other than the LED.

The strobe operation unit 304 detects a user's operation on an operation member (specifically, button, dial, switch, and the like) attached to the strobe device 300 and operated by the user, and sends an instruction signal corresponding to the operation to the strobe control unit 301.

The strobe display unit 305 displays the light emission setting, the radio wave setting, the operation state of the strobe, and the like in accordance with an instruction from the strobe control unit 301.

The wireless communication unit 306 (wireless communication unit) is wirelessly connected to another strobe device 300 via the wireless antenna unit 307, and transmits and receives wireless communication information to and from the another strobe device 300. The strobe control unit 301 is capable of transmitting and receiving control information such as information regarding light emission control to and from the another strobe device 300 to which the wireless communication unit 306 is wirelessly connected via the wireless antenna unit 307.

In the present embodiment, the configuration in which the light emitting unit 302 and the light unit 303 are provided separately is adopted; however, a configuration in which the light emitting unit 302 and the light unit 303 are integrated as in a strobe device using an LED as a main light source may be adopted.

Hereinafter, the operation of the photographing system 1 according to the present embodiment will be described with reference to FIGS. 3 to 6, 7A, and 7B.

Figure 3:
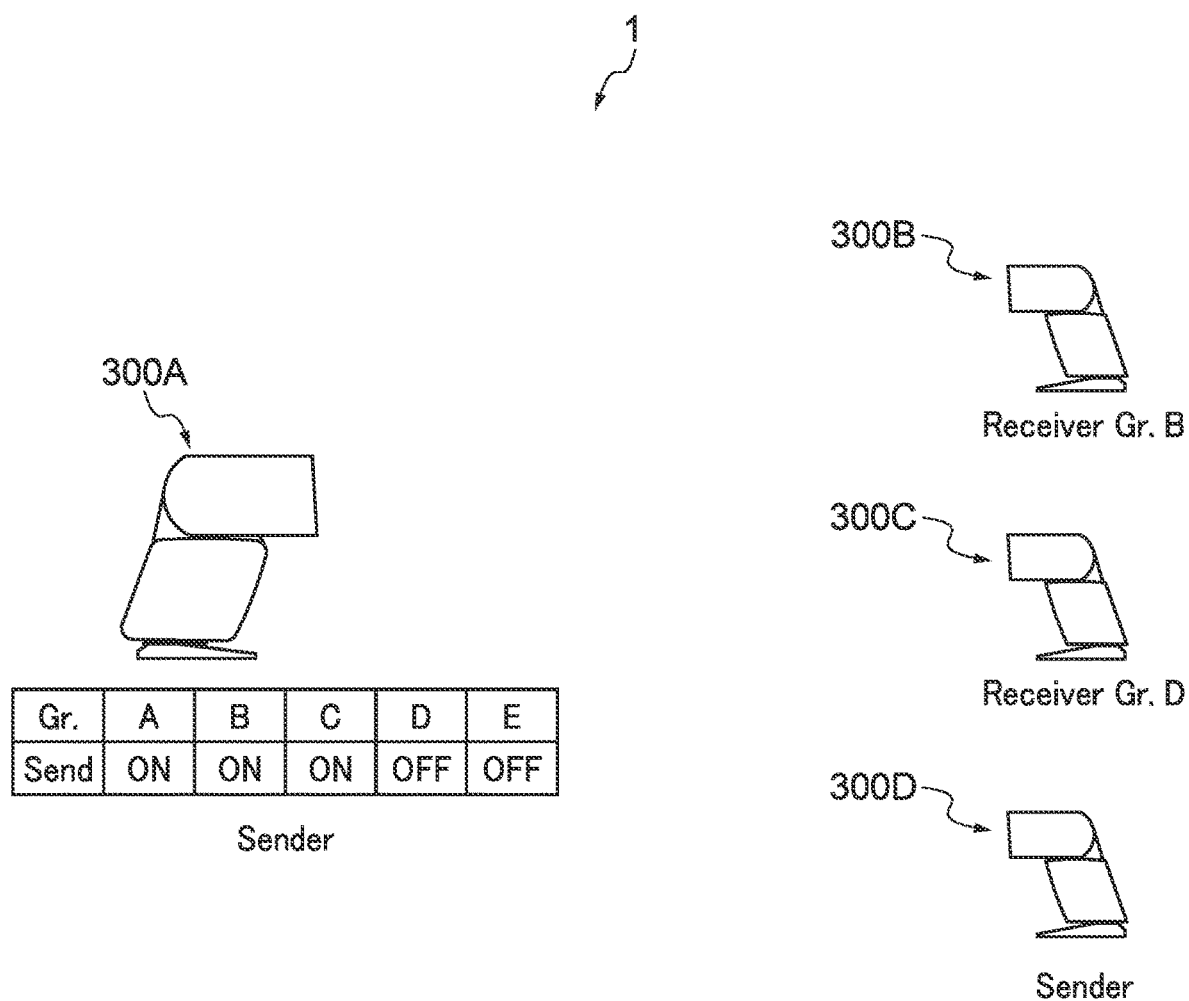
FIG. 3 is a schematic configuration diagram of a photographing system according to an embodiment of the present invention.

FIG. 3 is a schematic configuration diagram of the photographing system 1 according to the present embodiment, in which the strobe device 300A is wirelessly connected to the strobe devices 300B to 300D.

The strobe device 300A forms a personal area network (PAN) with each of the strobe devices 300B to 300D, by the wireless communication unit 306, and is capable of transmitting and receiving information to and from each of the strobe devices 300B to 300D. In the example shown in FIG. 3, the strobe devices 300A and 300D are sender strobe devices (sender lighting devices) that issue a light emission command to the receiver strobe device. The strobe devices 300B and 300C are receiver strobe devices that emit light in response to a command from the sender strobe device.

The sender strobe device is capable of selecting the light emission mode. In the present embodiment, the strobe device 300A, which is the sender strobe device selects the group mode (Gr. Mode) as the light emission mode. Note that the light emission mode selected by the strobe device 300A may be any light emission mode as long as it is a known method. Here, the group mode is a mode in which, by registering a plurality of strobe devices 300 in the same group (Gr.), the plurality of strobe devices registered in the said group can be controlled in the same manner according to a command to the said group from the sender strobe device. For example, the sender strobe device can, for each group, instruct each of the plurality of strobe devices 300 registered in the group to permit or prohibit light emission.

In the present embodiment, the strobe device 300A, which is the sender strobe device, instructs (sets) the group A to the group C (Gr. A to Gr. C) to "light emission permission", and instructs (sets) the group D and the group E (Gr. D, Gr. E) to "light emission prohibition". A light emission group (light emission Gr.) for the strobe device 300B, which is a receiver strobe device is Gr. B, and a light emission group for the strobe device 300C, which is a receiver strobe device is Gr. D. The strobe device 300D is a sender strobe device, and therefor is not registered in any light emission group set in the strobe device 300A.

Figure 4:
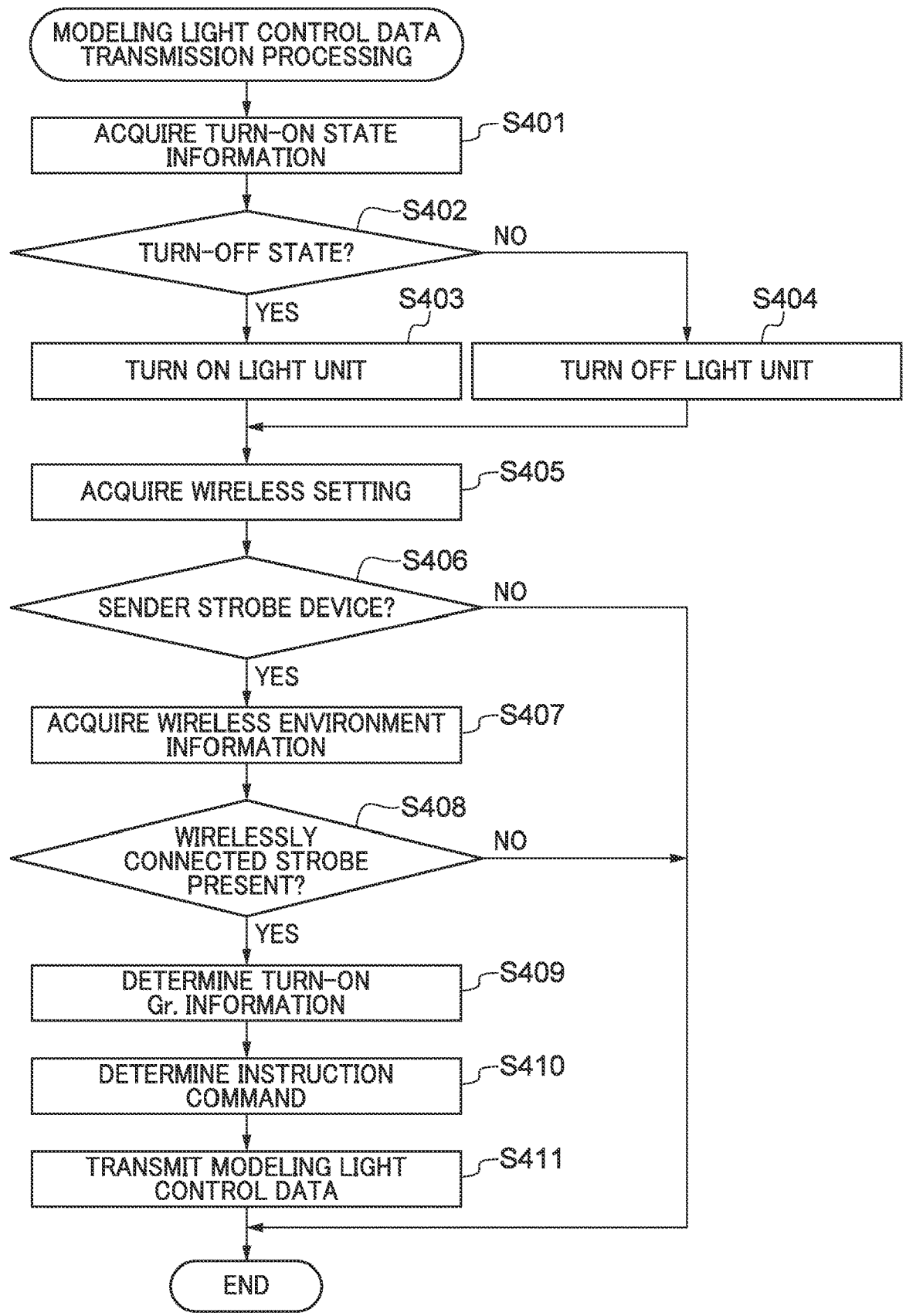
FIG. 4 is a flowchart of modeling light control data transmission processing according to the embodiment of the present invention.

FIG. 4 is a flowchart of modeling light control data transmission processing according to the embodiment of the present invention. The modeling light control data transmission processing executed in the strobe device 300A will be described below.

This processing is executed by the strobe control unit 301 of the strobe device 300A. In the description of the present processing, the term simply referred as "strobe control unit 301" refers to the strobe control unit 301 of the strobe device 300A. The present processing starts when the user presses a modeling light button (not shown) provided in the strobe operation unit 304 of the strobe device 300A (hereinafter, it is referred to as "at the time of modeling light operation"). Note that the present processing may be started when the camera control unit 101 transmits a predetermined control notification to the strobe device 300A via the strobe contact group 108 in response to pressing of a modeling light button (not shown) of the camera operation unit 105.

In step S401, the strobe control unit 301 of the strobe device 300A acquires the turn-on state information about the light unit 303 of the strobe device 300A (which is information indicating whether the light unit 303 of the strobe device 300A is in the turn-on state or the turn-off state), and advances the processing to step S402.

In step S402, the strobe control unit 301 determines whether or not the light unit 303 of the strobe device 300A is in the turn-off state based on the acquired turn-on state information. In a case of determining that the light unit 303 is in the turn-off state (YES in step S402), the strobe control unit 301 advances the processing to step S403. In a case of determining that the light unit 303 is not in the turn-off state (is in turn-on state) (NO in step S402), the strobe control unit 301 advances the processing to step S404.

In step S403, the strobe control unit 301 issues a turn-on command to the light unit 303 of the strobe device 300A to turn on the light unit 303, and advances the processing to step S405.

In step S404, the strobe control unit 301 issues a turn-off command to the light unit 303 of the strobe device 300A to turn off the light unit 303, and advances the processing to step S405.

The modeling light control in the present embodiment is toggle control. That is, when the modeling light operation is performed by the strobe operation unit 304 while the light unit 303 is in the turn-off state, the light unit 303 is turned on. When the modeling light operation is performed by the strobe operation unit 304 while the light unit 303 is in the turn-on state, the light unit 303 is turned off.

Note that the modeling light control of the present invention is not limited to the toggle control. For example, when the modeling light control data transmission processing is started by pressing the modeling light button, the strobe control unit 301 may advance the processing directly to step S403 and turn on the light unit 303 of the strobe device 300A regardless of whether the light unit 303 of the strobe device 300A is in the turn-off state or the turn-on state. That is, the modeling light control of the present invention may be control in which a modeling light control instruction (to be described later) including a turn-on instruction is transmitted to the strobe devices 300B to 300D by pressing a modeling light button under a predetermined condition.

In step S405, the strobe control unit 301 acquires the wireless setting for the strobe device 300A. The wireless setting here includes information indicating whether the strobe device 300A itself is a sender strobe device or a receiver strobe device, setting information of light emission permission/prohibition for each group, and light emission group information on the strobe device 300A itself. In the present embodiment, the light emission group information on the sender strobe device itself is fixed to the group A; however, may be dynamically changed to another group.

In step S406, the strobe control unit 301 determines whether or not the strobe device 300A is a sender strobe device, based on the wireless setting acquired in step S405. In a case of determining that the strobe device 300A is the sender strobe device (YES in step S406), the strobe control unit 301 advances the processing to step S407. In a case of determining that the strobe device 300A is not the sender strobe device (NO in step S406), the strobe control unit 301 ends this processing.

In step S407, the strobe control unit 301 acquires wireless environment information such as the address of the strobe device wirelessly connected to the strobe device 300A, and advances the processing to step S408.

In step S408, the strobe control unit 301 determines, based on the acquired wireless environment information, whether or not there is a strobe device wirelessly connected to the strobe device 300A. In a case where it is determined that there is a strobe device wirelessly connected to the strobe device 300A (YES in step S408), the processing proceeds to step S409. In a case where it is determined that there is no strobe device wirelessly connected to the strobe device 300A (NO in step S408), this processing ends. Hereinafter, processing after step S409 will be described assuming that the strobe devices 300B to 300D are wirelessly connected to the strobe device 300A (FIG. 3).

In step S409, the strobe control unit 301 determines turn-on group information (turn-on Gr. information) to be transmitted to the wirelessly connected strobe devices 300B to 300D. At this time, a group to be permitted to emit light is determined among the groups, according to the information acquired in step S405 (see also FIG. 6). The turn-on group information is 1 byte, and a group A to a group E (Gr. A to Gr. E) are allocated to bits. In a case where the group is in a mode such as ETTL or Manual, that is, in a case where the group is permitted to emit light (light emission permission), the bit value corresponding to the said group is set to 1, and in a case where the group is not permitted to emit light (light emission prohibition), the bit value corresponding to the said group is set to 0.

FIG. 6 is a diagram showing an example of the turn-on group information determined in step S409.

As described with reference to FIG. 3, since the light emission groups Gr. A to Gr. C are set as light emission permission, the bit values of Bit 0 to Bit 2 of the turn-on group information are determined to be 1. In addition, since the light emission groups Gr. D and Gr. E are set as light emission prohibition, the bit values of Bit 3 and Bit 4 of the turn-on group information are determined to be 0. Further, the bit values of unused bits Bit 5 to Bit 7 in the turn-on group information are determined to be 0.

FIG. 4 is referred to again. In step S410, the strobe control unit 301 determines an instruction command to be transmitted to the strobe devices 300B to 300D wirelessly connected to the strobe device 300A. According to the results of the processing of steps S401 to S404 (that is, whether the light unit 303 of the strobe device 300A is turned on or off), an instruction command to make the state to be, out of turn-on state and turn-off state, same as the state of the own device is determined. For example, in a case where it is determined in step S402 that the light unit 303 of the strobe device 300A is in the turn-off state and the light unit 303 is turned on in step S403, the command of the turn-on instruction is determined as the instruction command. On the other hand, in a case where it is determined in step S402 that the light unit 303 of the strobe device 300A is in the turn-on state and the light unit 303 is turned off in step S404, the command of the turn-off instruction is determined as the instruction command.

In step S411, the strobe control unit 301 controls the wireless communication unit 306 to wirelessly transmit the modeling light control data including the turn-on group information determined in step S409 and the instruction command determined in S410, to the wirelessly connected strobe devices 300B to 300D. In this way, when performing the modeling light control, the need for the strobe device 300A to wirelessly communicate with the strobe devices 300B to 300D a plurality of times, to separately transmit the turn-on instruction and the turn-off instruction is eliminated. That is, it is possible for the strobe device 300A to transmit a turn-on instruction and a turn-off instruction to the strobe devices 300B to 300D by one wireless communication.

Figure 5:
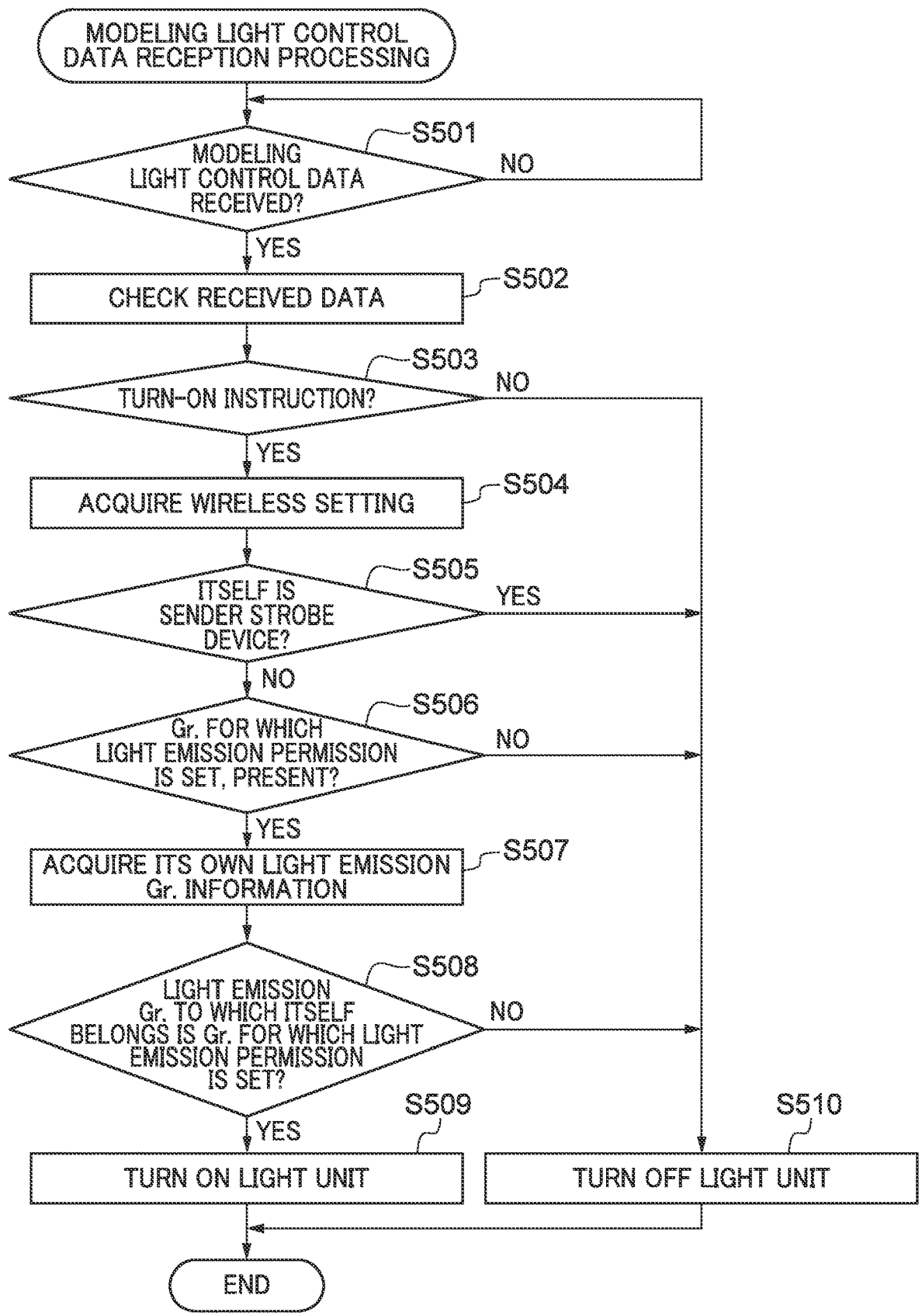
FIG. 5 is a flowchart of modeling light control data reception processing according to the embodiment of the present invention.

FIG. 5 is a flowchart of modeling light control data reception processing according to the embodiment of the present invention. The modeling light control data reception processing executed in the strobe devices 300B to 300D will be described below.

This processing is executed by the strobe control unit 301 of each of the strobe devices 300B to 300D, and is started when the modeling light control data is transmitted in step S411 from the strobe device 300A to each of the strobe devices 300B to 300D. In the description of the present processing, the term simply referred as "strobe control unit 301" refers to the strobe control unit 301 of each strobe device that has received the wireless communication, that is, the strobe control unit 301 of each of the strobe devices 300B to 300D.

In step S501, the strobe control unit 301 of each of the strobe devices 300B to 300D monitors the reception of the modeling light control data from the strobe device 300A by the wireless communication unit 306. In a case where the modeling light control data is received (YES in step S501), the strobe control unit 301 advances the processing to step S502; otherwise (NO in step S501), the strobe control unit 301 continues the monitoring in step S501.

In step S502, the strobe control unit 301 checks the received data (modeling light control data) received by the wireless communication unit 306. The received data is a combination of a command section in which an instruction command is described and a data section in which data (turn-on group information) is described. In general, interpretation of data described in a data section changes according to an instruction command described in a command section.

In step S503, the strobe control unit 301 determines whether or not the instruction command of the received data is a turn-on instruction command (that is, whether it is a command of a turn-on instruction or a command of a turn-off instruction). In a case where it is determined that the instruction command of the received data is the turn-on instruction command (YES in step S503), the strobe control unit 301 (determination unit) that has received the turn-on instruction command determines in steps S504 to S508 whether the strobe control unit itself is a turn-on target or is not a turn-on target. On the other hand, in a case where it is determined that the instruction command of the received data is the turn-off instruction command (NO in step S503), the strobe control unit 301 advances the processing to step S510.

In step S504, the strobe control unit 301 acquires the wireless setting of the strobe device itself that has received the wireless communication, similarly to step S405.

In step S505, the strobe control unit 301 determines, based on the wireless setting acquired in step S504, whether or not the strobe device itself that has received the wireless communication is the sender strobe device. In a case where it is determined that the strobe device itself that has received the wireless communication is the sender strobe device (YES in step S505), the strobe control unit 301 determines that the strobe device itself including the strobe control unit 301 itself is not the turn-on target, and advances the processing to step S510. In a case where it is determined that the strobe device itself that has received the wireless communication is not the sender strobe device (that is, it is a receiver strobe device) (NO in step S505), the processing proceeds to step S506.

In step S510, the strobe control unit 301 of the strobe device 300D, which is the sender strobe device and has received the wireless communication, turns off the light unit 303 of the strobe device 300D, and ends the present processing. Note that the strobe device 300D (the strobe control unit 301 thereof) may check the turn-on state of its own light unit 303, and may turn off the said light unit 303 only in a case where the said light unit 303 is in the turn-on state, and may end the present processing without doing anything in a case where the said light unit 303 is in the turn-off state.

As described above, in the present embodiment, since the strobe device 300D is the sender strobe device, the light unit 303 is turned off by the processing of FIG. 5. That is, in a case where the user performs the modeling light operation at the time of photographing by the image pickup apparatus 10 to which the strobe device 300A that is the sender strobe device is mounted, the other sender strobe devices unrelated to photographing are turned off. In this way, it is possible to quickly realize the shadow/shade that the user wants to check by the modeling light.

In step S506, the strobe control unit 301 of the strobe device, which is the receiver strobe device and has received the wireless communication, determines whether or not there is a group for which the light emission permission is set in the received data (lighting request) checked in step S502. In a case where it is determined that there is a group for which the light emission permission is set (YES in step S506), the processing proceeds to step S507. On the other hand, in a case where it is determined that there is no group for which light emission permission is set (that is, there are only groups for which light emission prohibition is set) (NO in step S506), the strobe device (the strobe control unit 301 thereof) as the receiver strobe device determines that the strobe device itself is not the turn-on target, and advances the processing to step S510 to turn off the light unit 303 of the strobe device itself, and ends the processing.

In step S507, the strobe device (the strobe control unit 301 thereof) that has received the wireless communication acquires light emission group information for the strobe device itself, and the processing proceeds to step S508.

In step S508, the strobe control unit 301 determines, based on the turn-on group information included in the received data and the light emission group information acquired in step S507, whether the group, to which the strobe device itself that has received the wireless communication belongs, is the group for which the light emission permission is set or the group for which the light emission prohibition is set. In a case where the group to which the strobe device itself that has received the wireless communication belongs is the group for which the light emission permission is set (YES in step S508), the strobe device (the strobe control unit 301 thereof) that has received the wireless communication determines that the strobe device itself is the turn-on target, and advances the processing to step S509 to turn on light unit 303 of the strobe device itself. On the other hand, in a case where the group to which the strobe device itself that has received the wireless communication belongs is the group for which the light emission prohibition is set (NO in step S508), the strobe device (the strobe control unit 301 thereof) that has received the wireless communication determines that the strobe device itself is not the turn-on target, and advances the processing to step S510 to turn off the light unit 303 of the strobe device itself.

In the present embodiment, since the strobe device 300B belongs to Gr. B and the light emission permission is set for Gr. B in the turn-on group information (FIG. 6), the strobe device 300B turns on its own light unit 303. On the other hand, since the strobe device 300C belongs to Gr. D and the light emission prohibition is set for Gr. D in the turn-on group information (FIG. 6), the strobe device 300C turns off its own light unit 303. As a result, it is possible, if the strobe device 300C not related to light emission of the strobe device 300A is on, to turn off the strobe device 300C.

FIGS. 7A and 7B are timing charts of transmission of turn-on instructions/turn-off instructions to a plurality of receiver strobe devices from the sender strobe device when the modeling light operation is performed. In each timing chart, the horizontal axis represents time.

Figure 2:
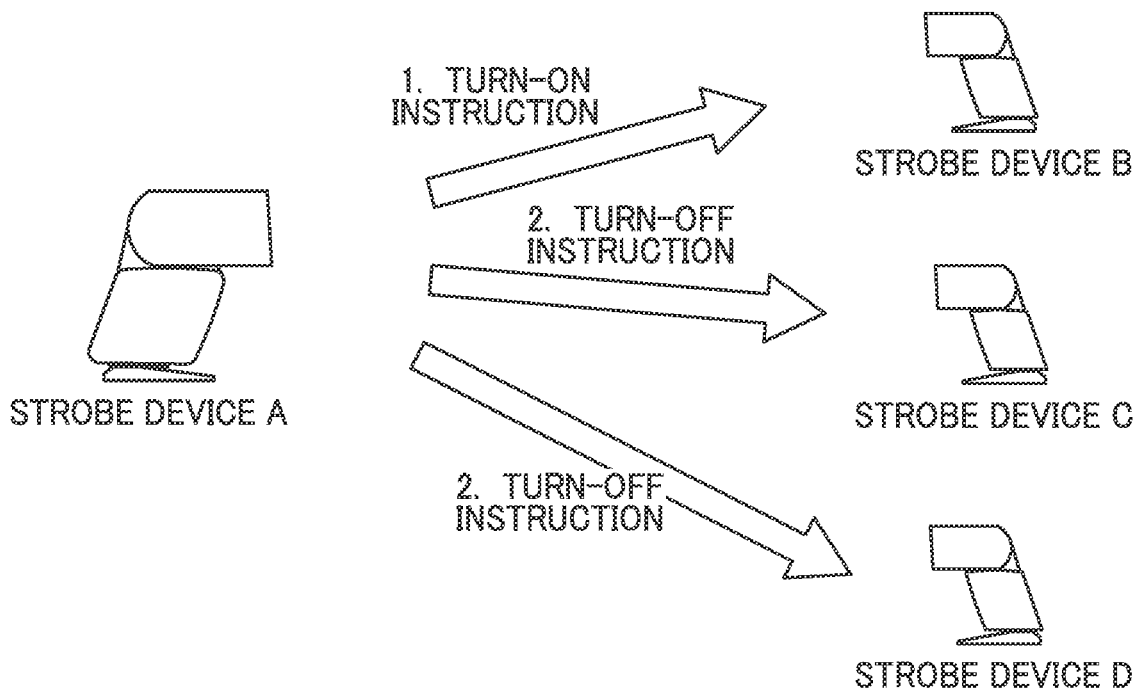
FIG. 2 is a diagram showing a photographing system of a conventional example that separately transmits a turn-on instruction and a turn-off instruction.

FIG. 7A shows a timing chart of processing executed in the conventional photographing system shown in FIG. 2, in a configuration in which the turn-on instruction and the turn-off instruction are separately transmitted to the strobe devices B to D. FIG. 7B shows a timing chart of processing, executed in the photographing system 1 according to the present embodiment shown in FIG. 3, in a configuration in which a turn-on instruction and a turn-off instruction are transmitted to the strobe devices 300B to 300D without being separated.

Referring to FIG. 7A, the strobe device A wirelessly transmits a turn-on instruction to the strobe device B, and then wirelessly transmits a turn-off instruction to the strobe devices C and D. Therefore, the number of times of transmission of the instruction increases, and it takes time to turn off the light unit including the LED (not shown) included in the strobe devices C and D to be turned off. On the other hand, referring to FIG. 7B, the strobe device 300A wirelessly transmits the turn-on instruction and the turn-off instruction collectively (without separating the turn-on instruction and the turn-off instruction) to all the strobe devices 300B to 300D that are wirelessly connected. Therefore, the light unit 303 of the strobe device 300C, 300D to be turned off can be quickly turned off.

That is, in the present embodiment, the time required to turn off the light unit of the strobe device to be turned off when the modeling light operation is performed is shorter than that in the conventional technique (FIG. 7A).

With the above configuration, the modeling light control can be performed by the sender strobe device issuing the modeling instruction to other strobe devices wirelessly connected to the sender strobe device only once. Therefore, the shadow/shade that the user wants to check can be quickly realized by the modeling light without impairing the real-time property.

Note that, in the present embodiment, it is also possible to implement processing in which a program for implementing one or more functions is supplied to a computer of a system or an apparatus via a network or a storage medium, and a system control unit of the system or the apparatus reads and executes the program. A system control unit may have one or more processors or circuits, and may include multiple separated system control units or a network of multiple separated processors or circuits to read and execute executable instructions.

A processor or circuit may include a central processing unit (CPU), a micro processing unit (MPU), a graphics processing unit (GPU), an application specific integrated circuit (ASIC), and a field programmable gate array (FPGA). The processor or circuit may also include a digital signal processor (DSP), data flow processor (DFP), or neural processing unit (NPU).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151870, filed Sep. 22, 2022, which is hereby incorporated by reference wherein in its entirety.

What is claimed is:

1. A photographing system comprising: a plurality of lighting devices each having a light unit capable of being on continuously; and a lighting control device wirelessly connected to the plurality of lighting devices and configured to control turning on/off of the light units of the plurality of lighting devices, the photographing system comprising:
    at least one memory that stores a set of instructions; and
    at least one processor that is configured to, based on the instructions,
    cause the lighting control device to:
    perform wireless communication with the plurality of lighting devices;
    generate a turn-on instruction for the light unit; and
    transmit, to the plurality of lighting devices by the wireless communication: the turn-on instruction; information on a group to which each of the plurality of lighting devices belongs; and turn-on group information including a setting of one of light emission permission and light emission prohibition set for the group; and
    cause each of the plurality of lighting devices to:
    perform the wireless communication with the lighting control device;
    in a case where the turn-on instruction from the lighting control device is received by the wireless communication, determine whether the lighting device itself is a turn-on target or is not a turn-on target; and
    turn off the light unit in a case where it is determined that the lighting device itself is not the turn-on target, and turn on the light unit in a case where it is determined that the lighting device itself is the turn-on target.

2. A lighting device having a light unit that is capable of being on continuously, the lighting device comprising:
    at least one memory that stores a set of instructions; and
    at least one processor that is configured to, based on the instructions, cause the lighting device to:
    wirelessly connect to a lighting control device that is configured to control turning on/off of the light unit of the lighting device to perform wireless communication with the lighting control device;

in a case where a turn-on instruction from the lighting control device is received via the wireless communication, determine whether the lighting device itself is a turn-on target or is not a turn-on target; and turn off the light unit in a case where it is determined that the lighting device itself is not the turn-on target, and turn on the light unit in a case where it is determined that the lighting device itself is the turn-on target.

3. The lighting device according to claim 2, wherein in a case where the lighting device itself is a sender lighting device, it is determined that the lighting device itself is not the turn-on target.

4. The lighting device according to claim 2, wherein the turn-on instruction is transmitted from the lighting control device together with information on a group, to which each of a plurality of lighting devices wirelessly connected to the lighting control device belongs, and turn-on group information including a setting of one of light emission permission and light emission prohibition set for the group.

5. The lighting device according to claim 4, wherein in a case where the light emission prohibition is set for all groups in the turn-on group information, it is determined that the lighting device itself is not the turn-on target.

6. The lighting device according to claim 4, wherein
the lighting device holds information on a group to which the lighting device itself belongs, and
in a case where the light emission permission is set for the group to which the lighting device belongs in the turn-on group information, it is determined that the lighting device itself is the turn-on target.

7. A method for controlling a lighting device having a light unit that is capable of being on continuously, the method comprising:

wirelessly connecting to a lighting control device that is configured to control turning on/off of the light unit of the lighting device to perform wireless communication with the lighting control device;

determining, in a case where a turn-on instruction from the lighting control device is received by the wireless communication, whether the lighting device itself is a turn-on target or is not a turn-on target; and turning off the light unit in a case where it is determined that the lighting device itself is not the turn-on target, and turning on the light unit in a case where it is determined that the lighting device itself is the turn-on target.

8. A non-transitory storage medium storing a computer-executable program for executing a method for controlling a lighting device having a light unit that is capable of being on continuously, the method comprising:

wirelessly connecting to a lighting control device that is configured to control turning on/off of the light unit of the lighting device to perform wireless communication with the lighting control device;

determining, in a case where a turn-on instruction from the lighting control device is received by the wireless communication, whether the lighting device itself is a turn-on target or is not a turn-on target; and turning off the light unit in a case where it is determined that the lighting device itself is not the turn-on target, and turning on the light unit in a case where it is determined that the lighting device itself is the turn-on target.

9. A lighting control device that is wirelessly connected to a plurality of lighting devices each having a light unit capable of being on continuously and controls turning on/off of the light units of the plurality of lighting devices, the lighting control device comprising:

at least one memory that stores a set of instructions; and
at least one processor that is configured to, based on the instructions, cause the lighting control device to:
perform wireless communication with the plurality of lighting devices;
generate a turn-on instruction for the light unit; and
transmit, to the plurality of lighting devices by the wireless communication: the turn-on instruction; information on a group to which each of the plurality of lighting devices belongs; and turn-on group information including a setting of one of light emission permission and light emission prohibition set for the group.

10. The lighting control device according to claim 9, wherein the turn-on instruction is generated when a predetermined operation is performed on an operation unit provided in the lighting control device.

11. The lighting control device according to claim 10, wherein
the lighting control device is a sender lighting device including a sender light unit capable of being on continuously, and
in a case where the sender light unit is in a turn-on state when the predetermined operation is performed, a turn-off instruction for the light unit is generated instead of the turn-on instruction.

12. The lighting control device according to claim 9, wherein
the lighting control device is configured to perform wired communication with an image pickup apparatus, and
the turn-on instruction is generated when a predetermined control notification is received from the image pickup apparatus via the wired communication.

13. The lighting control device according to claim 12, wherein
the lighting control device is a sender lighting device including a sender light unit capable of being on continuously, and
in a case where the sender light unit is in a turn-on state when the predetermined control notification is received, a turn-off instruction for the light unit is generated instead of the turn-on instruction.

14. A method for controlling a lighting control device that is wirelessly connected to a plurality of lighting devices each having a light unit capable of being on continuously and controls turning on/off of the light units of the plurality of lighting devices, the method comprising:

performing wireless communication with the plurality of lighting devices;
generating a turn-on instruction for the light unit; and
transmitting, to the plurality of lighting devices by the wireless communication: the turn-on instruction; information on a group to which each of the plurality of lighting devices belongs; and turn-on group information including a setting of one of light emission permission and light emission prohibition set for the group.

15. A non-transitory storage medium storing a computer-executable program for executing a method for controlling a lighting control device that is wirelessly connected to a plurality of lighting devices each having a light unit capable of being on continuously and controls turning on/off of the light units of the plurality of lighting devices, the method comprising:

performing wireless communication with the plurality of lighting devices;

generating a turn-on instruction for the light unit; and transmitting, to the plurality of lighting devices by the wireless communication: the turn-on instruction; information on a group to which each of the plurality of lighting devices belongs; and turn-on group information including a setting of one of light emission permission and light emission prohibition set for the group.

\* \* \* \* \*